United States Patent
Mahrla et al.

(10) Patent No.: US 7,631,153 B2
(45) Date of Patent: Dec. 8, 2009

(54) DEVICE FOR TRANSMITTING DATA BETWEEN MEMORIES

(75) Inventors: Peter Mahrla, Zorneding (DE); John Barstow, Swindon (GB); Michael Goedecke, Munich (DE)

(73) Assignee: Infineon Technologies AG, Munich (DE)

( * ) Notice: Subject to any disclaimer, the term of this patent is extended or adjusted under 35 U.S.C. 154(b) by 120 days.

(21) Appl. No.: 11/460,888

(22) Filed: Jul. 28, 2006

(65) Prior Publication Data

US 2007/0028030 A1 Feb. 1, 2007

Related U.S. Application Data

(63) Continuation of application No. PCT/DE2004/002749, filed on Dec. 15, 2004.

(30) Foreign Application Priority Data

Jan. 30, 2004 (DE) ...................... 10 2004 004 796

(51) Int. Cl.
*G06F 12/00* (2006.01)
(52) U.S. Cl. .................... 711/154; 711/103; 710/5; 710/22; 365/185.33
(58) Field of Classification Search ................ 711/154
See application file for complete search history.

(56) References Cited

U.S. PATENT DOCUMENTS

| 6,711,059 | B2 * | 3/2004 | Sinclair et al. | 365/185.11 |
| 6,748,457 | B2 * | 6/2004 | Fallon et al. | 710/2 |
| 2003/0120865 | A1 * | 6/2003 | McDonald et al. | 711/114 |
| 2003/0217202 | A1 | 11/2003 | Zilberman et al. | |

FOREIGN PATENT DOCUMENTS

| EP | 0206657 | 12/1986 |
| WO | 03/104976 | 12/2003 |

OTHER PUBLICATIONS

PCT International Search Report dated Oct. 12, 2005.

* cited by examiner

*Primary Examiner*—Brian R Peugh
*Assistant Examiner*—Matthew Bradley
(74) *Attorney, Agent, or Firm*—Patterson & Sheridan, L.L.P.

(57) ABSTRACT

An apparatus for data transmission between memories has a memory controller as well as a memory protocol controller. In one embodiment, a first memory controller is operatively connected to a first memory, and a memory protocol controller is operatively connected between the first memory controller and a second memory, wherein the first memory is a volatile memory and the second memory is a nonvolatile memory. The volatile memory includes a command list containing a command sequence for the memory protocol controller. The memory protocol controller may be configured to produce at least one of an error detection code and an error correction code when an error condition occurs.

17 Claims, 12 Drawing Sheets

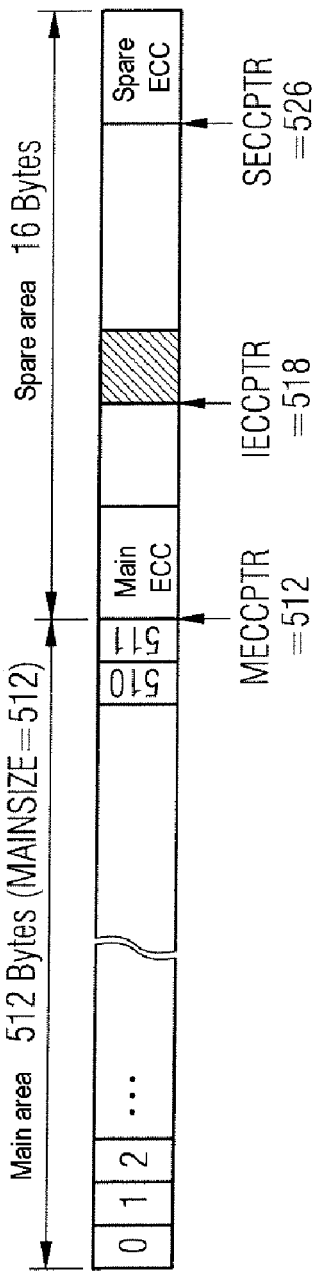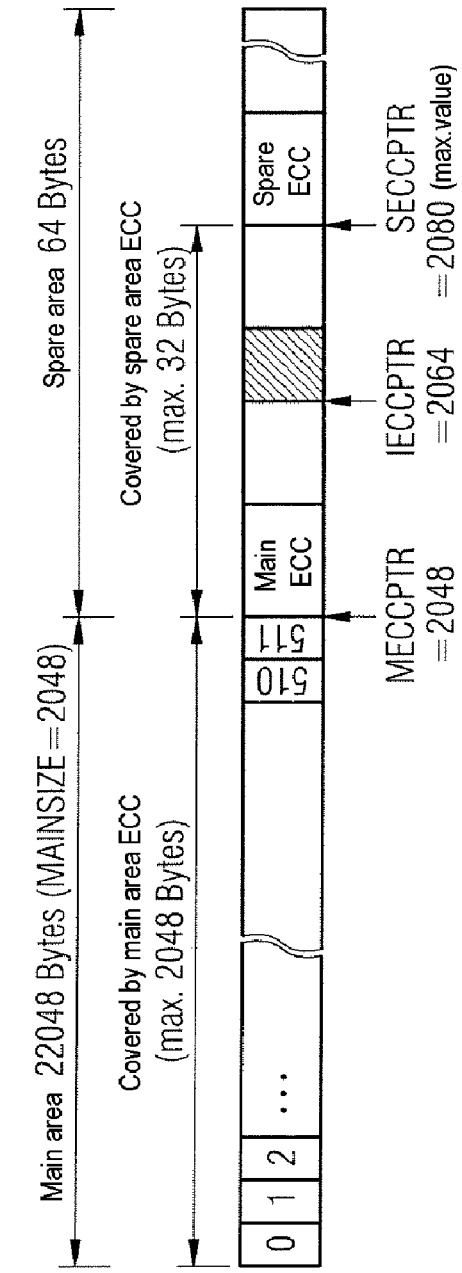
FIG 8
FIG 9

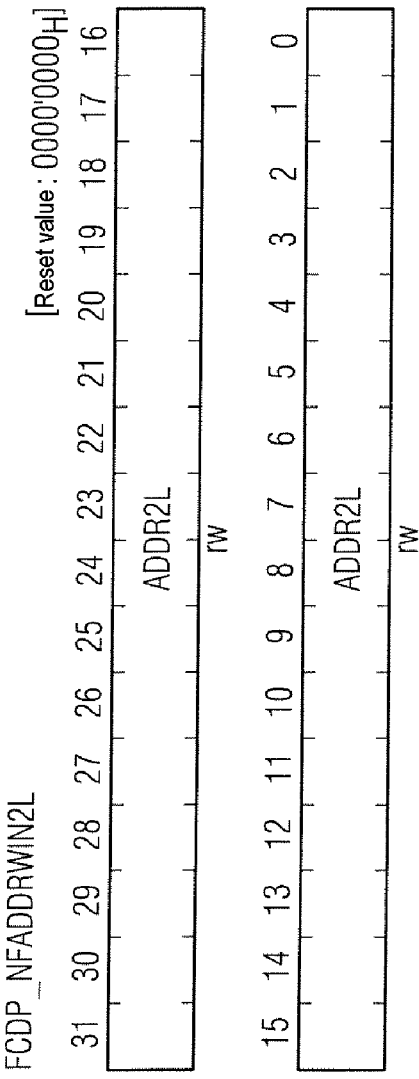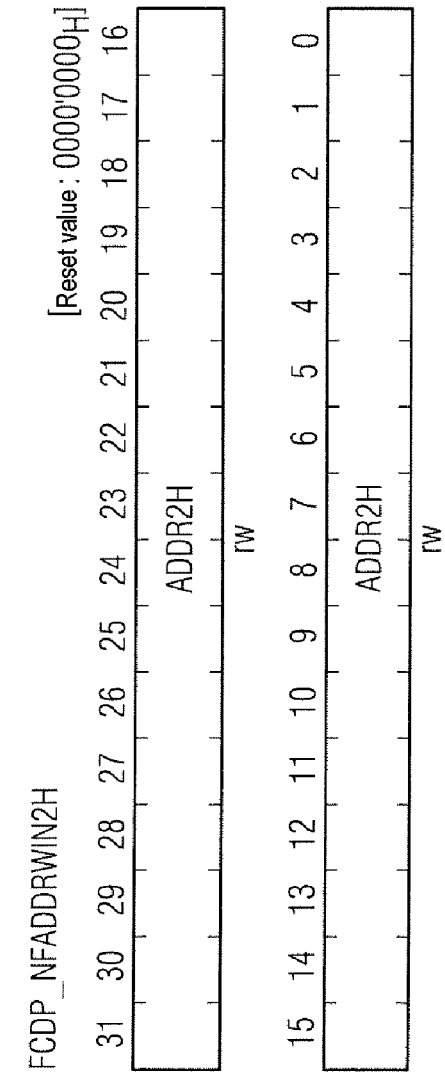

DEVICE FOR TRANSMITTING DATA BETWEEN MEMORIES

CROSS-REFERENCE TO RELATED APPLICATIONS

This application is a continuation of co-pending PCT patent application No. PCT/DE2004/002749, filed 15 Dec. 2004, which claims the benefit of German patent application serial number DE 10 2004 004 796.0, filed 30 Jan. 2004. Each of the aforementioned related patent applications is herein incorporated by reference in its entirety.

BACKGROUND OF THE INVENTION

1. Field of the Invention

The invention relates to an apparatus for data transmission between memories.

2. Description of the Related Art

Large amounts of data frequently have to be transmitted between volatile and non-volatile memories in microprocessor systems. The access speed is normally higher when the code of the volatile memory is used, and data is therefore normally transferred from the non-volatile memory to the volatile memory during the system start, in order to make it possible to achieve a higher running speed. Data is also transferred between volatile memory and non-volatile memory while programs are being run, in order to optimally use the restricted volatile memory and/or to ensure data protection in the event of a power failure.

The memory access is highly dependent on the type of memory used. For example, access to a volatile asynchronous RAM is relatively simple. Other memory devices, for example, non-volatile NAND flash devices, require a relatively complex access protocol. Non-volatile memory devices with an NAND structure, such as the Infineon® NROM, are currently becoming significantly more important because of the increasing memory requirement in mobile apparatuses, for example, digital photographic cameras, mobile telephones, PDAs or notebooks, and because of their extremely low costs. Random access to these memory devices is very slow and requires code and data transfer to a faster volatile memory (VM) before running the program. Owing to their internal structure, the reading or writing of relatively large data blocks, for example memory pages, is the optimum data transfer mode. For read accesses, after outputting a read command and the page address to the NAND flash device, the data is first of all transmitted to a buffer within the device, and this typically requires transmission times in the order of magnitude of several tenths of microseconds. As soon as the NAND flash device signals the completion of this transmission, all of the page data (512 or 2048 bytes) can be transmitted to the volatile memory at a high data speed of up to 40 MB per second. Furthermore, NAND flash devices have a tendency to bit errors, which necessitates bit error detection and bit error correction before data transmission to the volatile memory.

Data transfer between VM and non-volatile memory (NVM) should be carried out at the maximum possible speed in order to minimize the system start-up time. Furthermore, data transmission should be possible while the microprocessor is running programs, in order to allow dynamic loading of code and data. Furthermore, the influence of the data transfers on the performance of the microprocessor should be minimized. Ideally, the microprocessor stores a list of data transmission tasks in a volatile memory and is interrupted only after these tasks have been completely ended.

Data transmissions between memories are normally carried out using a direct memory access controller (DMAC). DMACs are, however, restricted to simple types of access and are not able to cope with more complex data transmission protocols. In the latter case, a microcontroller has to control the data transmission.

There is a need for an apparatus for transmitting data as quickly as possible between memories, and which is able to cope with even more complex data transmission protocols, but in the process requiring as little hardware as possible, and with the capability of being flexibly matched to widely differing operating conditions.

SUMMARY OF THE INVENTION

Embodiments of the invention provides an apparatus for transmitting data as quickly as possible between memories, and which is able to cope with even more complex data transmission protocols, but in the process requiring as little hardware as possible, and with the capability of being flexibly matched to widely differing operating conditions.

One aspect of the present invention is that there is no need to additionally also use a dedicated data transmission controller, so that the overall hardware is minimized and that existing hardware, such as the DMAC or the conventional memory controller, is reused. Furthermore, the flexibility is maximized since only one basic transmission protocol may be implemented in hardware. All further adaptations to different applications can be carried out in software, using one and the same hardware structure. In comparison to the prior art, in which the respective additional specific data transmission controller was matched by dedicated hardware to the respective specific application requirements, this increases the production flexibility, thus making a considerable contribution to cost reduction.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 8 shows, schematically, a first exemplary embodiment of a NAND flash page configuration with a page size of (512+16)×8 bits;

FIG. 9 shows, schematically, a second exemplary embodiment of a NAND flash page configuration with a page size of (2048+64)×8 bits;

FIG. 21 shows, schematically, the FCDP_NFADDRWIN2L register according to the FCDP exemplary embodiment shown in FIG. 5, in which case a description of the associated register fields can be found in Table 14; and FIG. 22 shows, schematically, the FCDP_NFADDRWIN2H register according to the FCDP exemplary embodiment shown in FIG. 5, in which case a description of the associated register fields can be found in Table 15.

DETAILED DESCRIPTION OF THE PREFERRED EMBODIMENT

Figure 1:
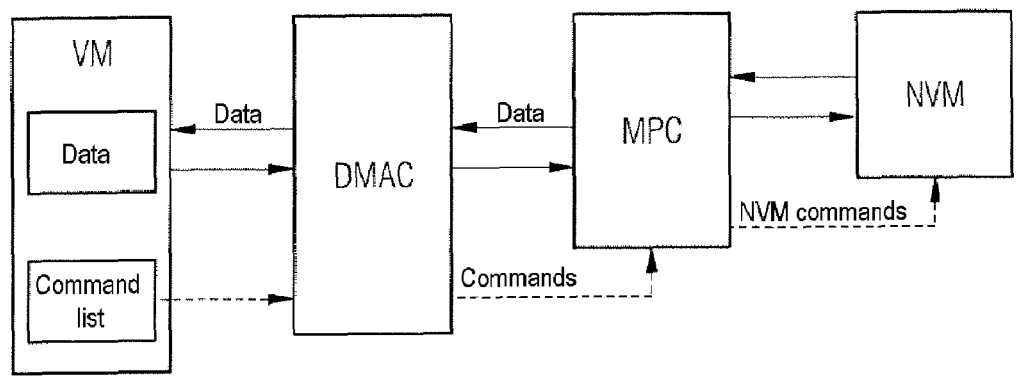
FIG. 1 shows a schematic block diagram of a first exemplary embodiment of an apparatus according to the invention with a direct memory access controller.

When a memory protocol controller (MPC) is used together with a DMAC, it is possible to cope with complex memory transmission protocols. The command sequence for the MPC is part of the command list in the VM (see FIG. 1). This list includes commands for the MPC and additionally commands for the NVM. Data which is intended to be transmitted to the NVM may either be stored in a separate list in the VM, or may be part of the command list.

Commands from the command list are transmitted by the DMAC to the NVM. Only the MPC commands are interpreted by the MPC. The commands for the NVM are passed to the NVM. For this purpose an "output to the NVM" command must precede the NVM command as such. Since NVM commands are not implemented in hardware, new or modified NVM commands can easily be coped with by adaptation of the command list.

Once the MPC has carried out a command, it normally passes a request for the next command on the command request line of the DMAC. The DMAC then transmits the next command from the VM to the MPC. This sequence is continued until the DMAC comes to the end of the command list. The DMAC then passes an interrupt signal to the microprocessor in order to signal that the task has been carried out completely. In order to place the MPC in an idle state, a stop command should be output to the MPC as the last command. The start of transmission is generally initiated by the microprocessor in that it sets a "run" bit in the MPC once the process of setting up the command list in the VM has been completed. After this, the process takes place without any further microprocessor control, unless error conditions occur.

MPC commands may be commands for transmission of a predetermined number of data words between VM and NVM. In this case, the MPC signals a plurality of requests for data transmission on a data request line of the DMAC. The DMAC will then carry out the data transmission between the MPC and the VM. In general, the data is buffered within the MPC in order to make it possible to optimally use the data bus characteristics at both ends. Minimizing the DMAC load may be an important aim. Data transmission in packets (bursts) may be the optimum solution. If the bandwidth of the bus to the NVM is narrower than the bandwidth of the bus to the DMAC, the MPC collects a suitable data packet from the NVM for a read operation from the NVM before the transmission is started. For a write operation to the NVM, the MPC will wait until the write operation to the NVM has been ended completely before it requests the next data packet from the DMAC.

The MPC can have NVM-specific control lines, such as the BUSY/READY# line of a NAND flash device. MPC commands may include instructions as to the procedure to be used with these control lines, for example, to wait for a level change on a control line before outputting a request for the next command.

In the case of NAND flash devices with their internal page structure, data transmissions may be handled in large blocks, which cover a plurality of pages, in a command script. Because of the special features of the NAND flash devices, a file may be expanded over a plurality of pages, which are distributed arbitrarily in the address area of the device. A complete file loading operation can be carried out by means of one command script. The command script may be compiled by the NAND flash file system software, which runs on the microprocessor.

Error conditions are signaled to the microprocessor by the MPC. The cause of the error and the address of the last command to be carried out are read by the microprocessor from a status register. All further requests are output to the DMAC. The microprocessor will deal with the error condition, and will restart the data transmission. For NVMs which require error detection and error correction, the error detection code and, if required, the error correction code as well are produced by the MPC. For read operations, the MPC may compare the error detection code produced during the read operation with the error detection code stored in the non-volatile memory device (NVM). In the event of a read error, the MPC either carries out the correction itself or triggers an interrupt to the microprocessor. For write operations, the MPC produces the error correction code, and writes this code to a predetermined point in the non-volatile memory device (NVM). This will all be described in more detail further below.

The MPC can also carry out data compression and data decompression for write and read operations.

Figure 2:
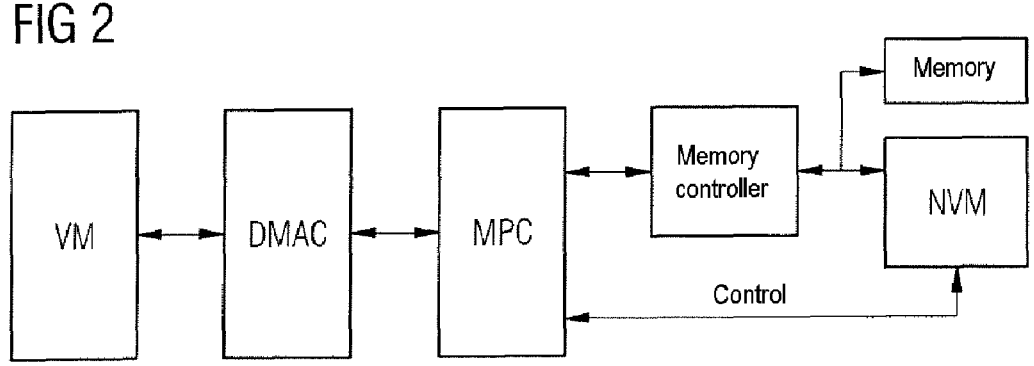
FIG. 2 shows a schematic block diagram of a second exemplary embodiment of an apparatus according to the invention using a direct memory access controller and a conventional memory controller.

The MPC can also be used together with a conventional memory controller if other memory devices have to be controlled without any protocol overhead on the same memory bus, as is illustrated in FIG. 2. The external components may share data lines, address lines and control signals. Dedicated NVM control lines may be connected directly to the MPC, as is illustrated in FIG. 2.

Figure 3:
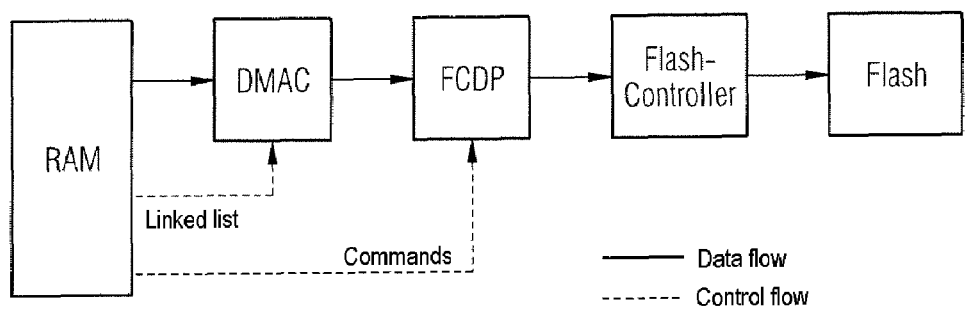
FIG. 3 shows, schematically, a data flow for an NAND flash write operation.
Figure 4:
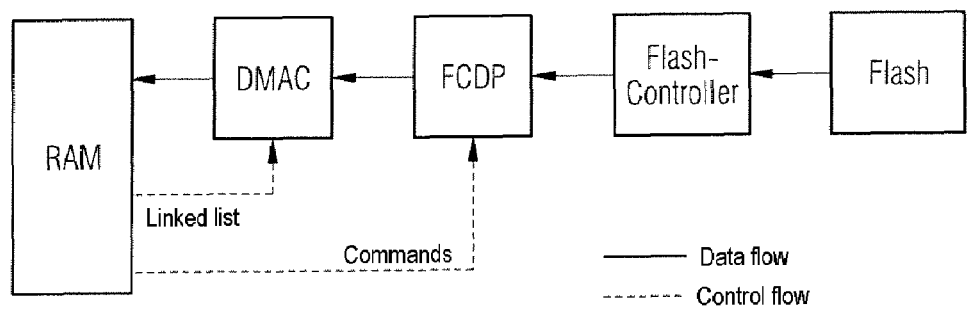
FIG. 4 shows, schematically, the data flow for a NAND flash read operation.

One exemplary embodiment of the apparatus shown in FIG. 2 will be explained in more detail in the following text with reference to FIGS. 3 to 22. FIG. 3 shows, schematically, the data flow for a NAND flash write operation, and FIG. 4 shows, schematically, the data flow for a NAND flash read operation. The memory protocol controller (MPC) from FIG. 2 is annotated in FIGS. 3 and 4 as a "flash control DMA port" (FCDP). The FCDP allows autonomous data block transmissions between flash devices (NAND flash and NOR flash) and a RAM, with the CPU load and the on-chip bus traffic being kept minimal. The flash controller from FIGS. 3 and 4 corresponds to the conventional memory controller from FIG. 2.

In order to reduce the CPU load, the FCDP in conjunction with the DMAC are able, after an initial configuration process, to transmit any desired amount of data (that is to say in the case of NAND flash: pages) without further assistance.

In addition, the FCDP produces an error correction code (ECC) for writing to NAND flash devices, and an error correction code check for reading from NAND flash devices. The read access to NOR flash devices is speeded up by the provision of a configurable address generator.

In order to reduce the bus data traffic, the FCDP supports bursts of four transmissions (32 bits), using an internal FIFO.

Figure 5:
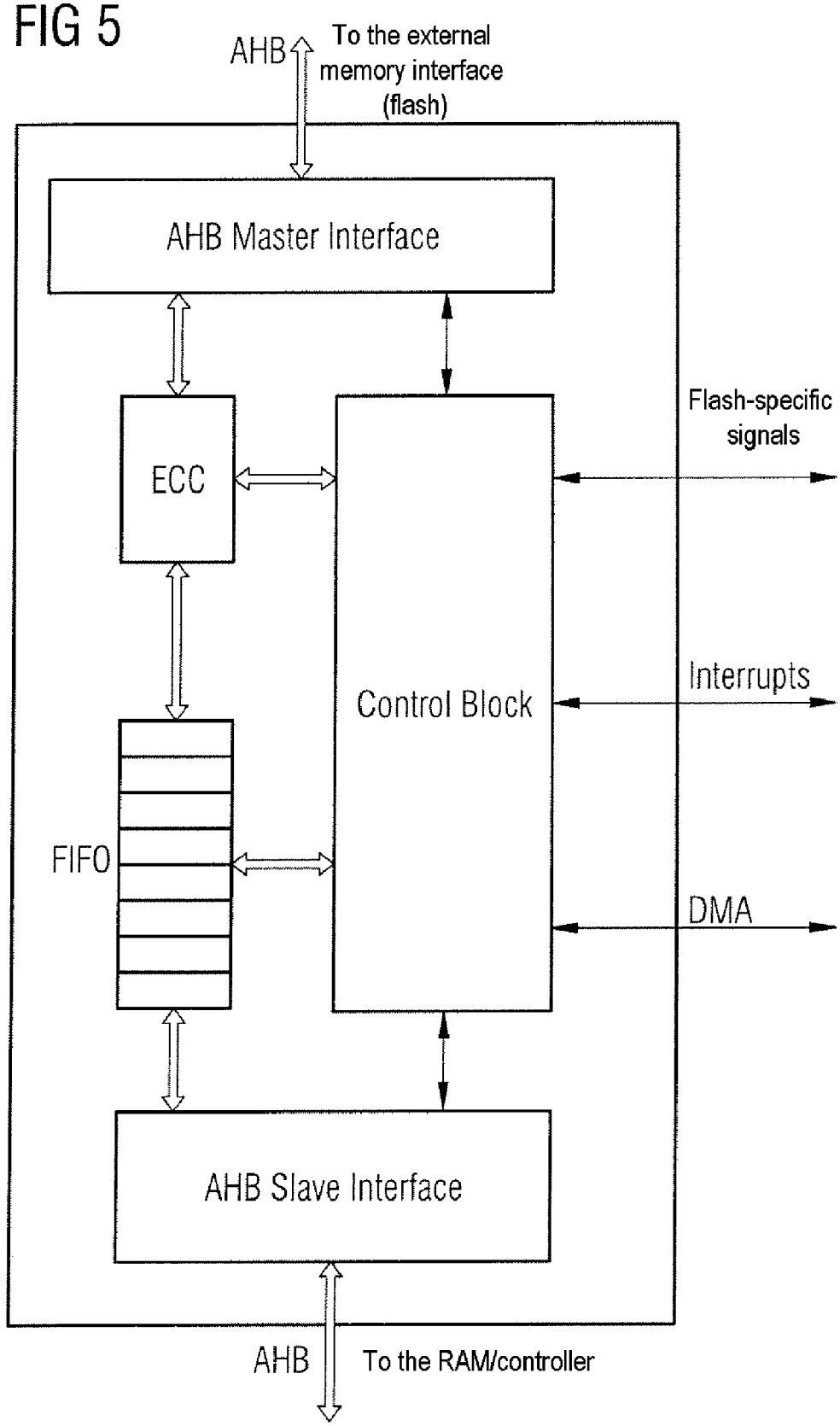
FIG. 5 shows a schematic block diagram of one exemplary embodiment of a flash control direct memory access port (FCDP)

The FCDP requires an external memory controller or flash controller in order to make it possible to be connected to the flash and in order to make it possible to produce device-specific time matching. FIG. 5 shows a schematic block diagram of the FCDP, with the FCDP in this case being illustrated at a very high level, that is to say subdivided into very coarse blocks.

The FCDP illustrated in FIG. 5
operates synchronously,
has a single clock (AHB clock/AHB=Advanced High Performance Bus=modern high-performance bus),
complies with the AMBA AHB Specification 2.0 ("AMBA" is a trade mark of Advanced RISC Machines Limited/ARM Ltd./and in fact denotes a standard for buses on chips),
has an AHB master with an AHB lite interface,
has an interface for ARM prime cell DMAC,
supports NAND flash reading/writing with hardware ECC,
supports NOR flash read transmissions, and
supports burst mode read/write transmissions.

In order to be supported by the FCDP, a NAND flash device must satisfy the following requirements:
support for the "CE don't care" mode,
a "busy/ready" output is operated only after an address or command cycle,
a column address comprises up to two address bytes,
a row address comprises up to four address bytes,
ECC production/detection:
main area: up to 2048 bytes,
spare area: up to 32 bytes, and
page size (if not restricted by the block size for the ECC): up to 4096 bytes.

The AHB slave interface carries out the following tasks:
data transfer from the RAM to the FCDP (flash write access),
data transfer from the FCDP to the RAM (flash read access),
FCDP configuration interface, and
FCDP command interface.

In most cases, the data transfer is handled using the DMA (Direct Memory Access) although, if desired, that is to say if insufficient DMA channels are available, it can also be carried out on an interrupt-driven basis by the CPU.

The configuration interface allows access to the FCDP control/status register. The register interface allows general operating modes to be configured which are used for a relatively large number of transactions, that is to say which are specific for the present flash device, the bus structure, the DMA configuration, the memory mapping, etc.

The command interface is intended for the purpose of controlling transmissions carried out by the FCDP. Many commands also require specific parameters. The command interface can be accessed via DMA, that is to say the copying of the next page is triggered when the previous page has been processed completely.

The AHB master interface handles transmissions to/from the external memory interface. Depending on how the overall system is set up, it may be designed such that it either uses burst transmissions in order to optimally utilize the bandwidth, or individual transmissions in order to reduce the decision delay on the AHB. In order to allow burst transmissions to be used efficiently, the external memory interface should be able to buffer a certain amount of data.

The FCDP also has an FIFO in order to allow transmissions to be maintained on one side while the other side is dealing with something else, such as, for example, when the bus access permission is not granted or the DMA channel is not ready. The FIFO also allows burst transmissions to be used on one AHB interface and individual transmissions to be used on the other AHB interface, when it is necessary.

The FCDP essentially uses a combined transmission/reception FIFO (TX/RX FIFO) based on the topspin peripheral architecture concept. However, because of the specific FCDP requirements, there are a few minor differences and special features such as follows.

There is no "maximum reception packet size" field in the FCDP_FIFO_CFG register, because the FCDP does not need to handle any unrequested transmissions, that is to say the packet size is defined only by the command word.

There is neither a "reception packet size" register (RPS_STAT), nor a "transmission packet size" register (TPS_CTRL), because the packet size for both read and write transactions is defined by the command word written to the FCDP_COMMAND register.

The FIFO always operates using word alignment.

The switching between the "reception state" and the "transmission state" is controlled by the command word written to the FCDP_COMMAND register.

The FCDP is always the flow controller, that is to say the sequence controller, for DMA transmissions.

In the case of the exemplary embodiment being described in the present case, the FIFO size is 8×32 bits.

In order to detect bit errors on NAND flash devices and—when possible—to correct them, the FCDP provides an error correction code (ECC) production and detection mechanism. The ECC algorithm is a Hamming code, which allows the correction of a single bit error and the detection of up to 2 bit errors within one page.

The ECC for the main area of a flash page is stored in the spare area of the same page. In a similar manner, the spare area is error-protected by a second ECC, which is likewise stored in the spare area.

Once an appropriate enable has been provided, the ECC is produced by the FCDP and is written on a write access to the flash, without any CPU assistance being required for this purpose. On read accesses, the ECC is produced by the data obtained from the flash and is compared with the ECC stored in the flash. If a mismatch is found, then an error interrupt is passed to the CPU, and further transactions are stopped. This makes it possible for the CPU to check whether the error can be corrected and, if possible, then to correct this error.

Both the main area and spare area ECC production and detection can be activated or deactivated independently of one another. In order to allow a flash file system to frequently change some information items, a few bits in the spare area are excluded from the ECC production.

The memory location of the main area and spare area ECC and of the unprotected section within a page are configurable.

A two-dimensional equality check is used as the ECC. This allows an efficient hardware implementation in terms of speed and area.

In order to check that the data on a NAND flash page has not been corrupted, the ECC which is stored on the flash and the ECC which is produced when reading the data are subjected to an exclusive-OR logic operation. This results in one of the following situations:

all bits are 0: no error;
each parity bit P<x> and its complement P<x>' differ from one another (P<x> <> P<x>'): correctable error;
only one bit is not 0: error in the ECC; and
otherwise (random data): uncorrectable error.

When an error occurs, the FCDP produces an error interrupt for the CPU. The error handling software then has to process the error in a suitable manner.

In the event of a correctable error, the ECC directly indicates the location of the erroneous bit within the page:

P8192, P4096, P2048, . . . , P16: 16-bit word address of a bit error.

P8, P4, P2, P1: bit position of the error.

An external memory interface is used in order to connect the flash devices.

Figure 6:
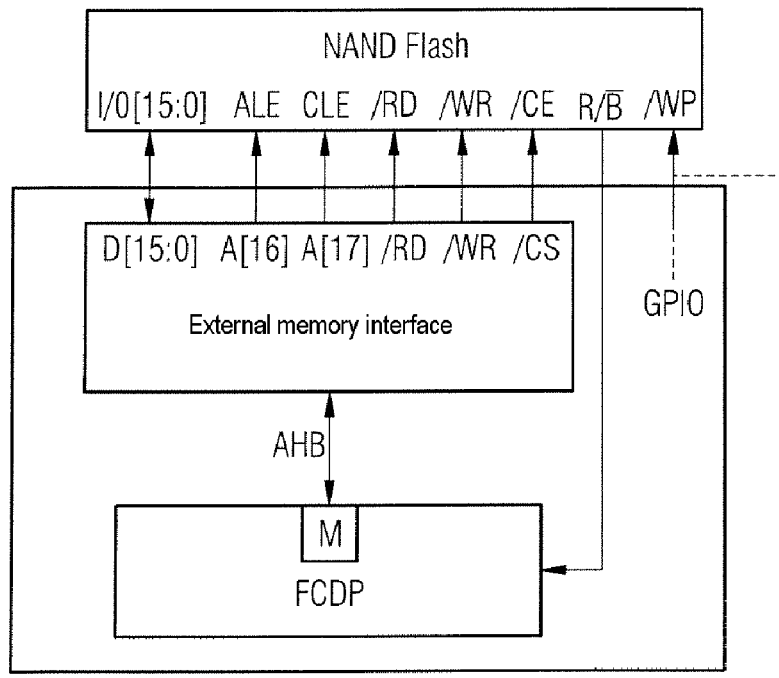
FIG. 6 shows one exemplary embodiment of a NAND flash interface.

In order to interact with the NAND flash device, the external memory controller is operated in the asynchronous mode. Two address output lines on the internal bit addresses A(17) and A(18), corresponding to the external 16-bit word addresses A(16) and A(17), are used in order to control the NAND flash input signals ALE (Address Latch Enable) and CLE (Command Latch Enable), as is shown in FIG. 6.

The NAND flash output signal R/B̄ is handled only by the FCDP. It is set to low by the flash device only while a command with a relatively long execution time (read page, write page, delete page) is being processed.

The read accesses to devices with a synchronous or asynchronous NOR flash interface require a suitable memory controller with an AHB slave port. A synchronous burst mode controller which is connected to a synchronous burst NOR flash achieves a significantly better transmission speed, since INCR4 requests on the AHB bus can be handled by burst transmissions from the flash device (INCR4 is the generally accepted abbreviation for a specific burst request in accordance with the AHB specification, on which the burst width is incremented /INCR/, that is to say increased).

Both NAND flash devices and NOR flash devices generally have a write protection (WP̄—Write Protect) input. This input is not controlled by the FCDP but must be handled in accordance with the device specification, for example by connecting it to a GPIO (General Purpose Input/Output) or to the switch-on reset signal.

Each FCDP transaction is initiated by writing a command to the FCDP command register. This is normally done by producing a command sequence in the RAM and by making the DMA controller ready to write a command to the FCDP on request. The first command request is triggered by software, by setting the DMA command request bit. Each subsequent command is requested by the FCDP once the execution of the previous command has been completed. The STOP command can be used to stop the FCDP from requesting further commands.

Table 1 provides an overview of the FCDP commands. As can be seen, some commands require additional parameters. While most commands are in the form of a single 32-bit word, there are some commands which require a second 32-bit word in order to allow encryption of a 32-bit address parameter.

TABLE 1

FCDP command overview

| Command | Write cycles | Parameter | Description |
|---|---|---|---|
| NF_CMD | 1 | cmd[7:0] wait | Write a command to the NAND flash<br>cmd: NAND flash command<br>wait: Wait for completion (R/W signal) |
| NF_ADDR | ½ | ncol [1:0]<br>nrow [2:0]<br>wait<br>col_addr [15:0]<br>row_addr [31:0] | Write an address to the NAND flash<br>ncol: Number of the valid column address byte<br>nrow: Number of the valid row address byte<br>wait: Wait for completion (R/W signal)<br>col_addr: Column address<br>row_addr: Row address |
| NF_WR | 1 | count [9:0]<br>burst | Write data to the NAND flash<br>count: Number of 32-bit words to be written<br>burst: Use INCR4 transmissions on AHB |
| NF_RD | 1 | count [9:0]<br>burst | Read data from the NAND flash<br>count: Number of 32-bit words to be read<br>burst: Use INCR4 transmissions on AHB |
| NF_CHECK | 1 | — | Check the NAND flash status |
| BM_ADDR | 2 | addr [31:0] | Reload the address generator for the burst mode<br>addr: Start address (aligned to 32 bits) |

TABLE 1-continued

FCDP command overview

| Command | Write cycles | Parameter | Description |
|---|---|---|---|
| BM_WR | 1 | count [9:0] burst | Write data using the burst mode<br>Count: Number of 32-bit words to be written<br>burst: Use INCR4 transmissions on AHB |
| BM_RD | 1 | count [9:0] burst | Read data using the burst mode<br>Count: Number of 32-bit words to be read<br>burst: Use INCR4 transmissions on AHB |
| STOP | 1 | — | Stop the FCDP; no further commands are requested |
| FLUSH | 1 | — | "Flush out" the FCDP, reset the transmission counter and reset the error state |

Table 2, below, shows an overview of the FCDP register interface.

TABLE 2

Register programming interface

| Register group | Register name | Register symbol |
|---|---|---|
| Control register | Clock control register | FCDP_CLC |
| | Mode control register | FCDP_MODE |
| | Command register | FCDP_COMMAND |
| | FIFO configuration register | FCDP_FIFO_CFG |
| | NAND flash basic address register | FCDP_NFBASE |
| | NAND flash status mask register | FCDP_NFMASK |
| | NAND flash status comparison register | FCDP_NFCOMP |
| | NAND flash ECC configuration register | FCDP_NFECCCONFIG |
| | NAND flash main area ECC pointer register | FCDP_NFMECCPTR |
| | NAND flash spare area ECC pointer register | FCDP_NFSECCPTR |
| | NAND flash ignoring area ECC pointer register | FCDP_NFIECCPTR |
| | NAND flash password register | FCDP_NFPASSWD |
| | NAND flash "protected command" register | FCDP_NFPROTCMD |
| | NAND flash address window 1 - lower limit register | FCDP_NFADFDRWIN1L |
| | NAND flash address window 1 - upper limit register | FCDP_NFADDRWIN1H |
| | NAND flash address window 2 - lower limit register | FCDP_NFADDRWIN2L |
| | NAND flash address window 2 - upper limit register | FCDP_NFADDRWIN2H |
| Status register | Transmission counter status register | FCDP_COUNT |
| | FIFO status register | FCDP_FFS_STAT |
| | NAND flash status register | FCDP_NFSTATUS |

TABLE 2-continued

Register programming interface

| Register group | Register name | Register symbol |
|---|---|---|
| | NAND flash main area ECC status register | FCDP_NFMECCST |
| | NAND flash spare area ECC status register | FCDP_NFSECCST |
| Data buffer event | FIFO write buffer register | FCDP_WRBUF |
| | FIFO read buffer register | FCDP_RDBUF |
| Interrupt/DMA register | Raw interrupt status register | FCDP_RIS |
| | Interrupt mask control register | FCDP_IMSC |
| | Masked interrupt status register | FCDP_MIS |
| | Interrupt reset register | FCDP_ICR |
| | Interrupt set register | FCDP_ISR |
| | DMA activation register | FCDP_DMAE |
| Identification register | Module identification register | FCDP_ID |
| Test register | Integration test control register | FCDP_ITCR |

The FCDP produces two types of DMA requests, specifically data requests and command requests. This provides an extraordinary simplification for the creation of linked lists for setting up the DMAC.

A DMA command request is produced whenever the execution of an FCDP command has been completed and a new command must be written to the FCDP command register. The DMA command request is always a single DMA request.

A DMA data request is produced whenever there is sufficient data in the FIFO during a flash read operation or whenever there is sufficient space in the FIFO during a flash write operation. All transmissions apart from the last, which is specified as such by the transmission number argument of an FCDP command end in a DMA burst request. The last transmission ends in a DMA "last burst" request, which signals to the DMAC that it must change to the next item in the linked list.

If insufficient DMA channels are available, it is also possible, instead of this, to use the data request interrupt, the "last data request" interrupt and the command request interrupt.

Various interrupt requests will be described in more detail in the following text.

Command Request Interrupt (CMD)

A call of the command request interrupt indicates to the FCDP that the next command can be written to the command register (FCDP_COMMAND) and that the execution of the previous command has been completed. The command request interrupt can be used instead of the DMA command request.

Data Burst Request Interrupt (DAT)

The FCDP outputs the data burst request interrupt in order to indicate that data must be written to the write buffer register (FCDP_WRBUF) or that data must be read from the read buffer register (FCDP_RDBUF), depending on which command is currently being carried out. The burst size may be programmed to be either one or four words. The data burst request is output for each data burst within a sequence, as it is defined by the command, with the exception of the last burst. The data burst request interrupt may be used instead of the DMA data burst request.

"Last Data Burst" Request Interrupt (LDAT)

The "last data burst" request interrupt has virtually the same meaning as the data burst request interrupt. The only difference is that the LDAT is output only for the last burst within a sequence, as it is defined by the command. The LDAT can be used instead of the DMA "last burst" request.

Main Area ECC Error Interrupt (MECC)

A main area ECC error interrupt occurs when a mismatch has been found between the ECC read from a NAND flash page and the ECC produced from the data read from the main area of this page, and the main area ECC check is activated in the FCDP_NFECCCONFIG register. The main area ECC error interrupt is reset internally until all the transmissions have been completed, and all the data has been read from the FCDP_RDBUF register. The FCDP then waits for the FLUSH command in order to ensure that the error has been identified independently of the interrupt delay. After reception of the FLUSH command, the FCDP resumes its normal operation by requesting the next command.

Spare Area ECC Error Interrupt (SECC)

A spare area ECC error interrupt occurs when a mismatch has been found between the ECC read from a NAND flash page and the ECC produced by the data read from the spare area on this page, and the spare area ECC check is activated in the FCDP_NFECCCONFIG register. The spare area ECC error interrupt is pushed up internally until all the transmissions have been completed, and all the data has been read from the FCDP_RDBUF register. The FCDP then waits for the FLUSH command in order to ensure that the error has been identified independently of the interrupt delay. After reception of the FLUSH command, the FCDP resumes its normal operation by requesting the next command.

Flash Status Error Interrupt (ST)

A flash status error interrupt occurs after carrying out the NF_CHECK command when a mismatch has been found between the status byte read from the NAND flash device and the expected value defined in the NAND flash status comparison register (FCDP_NFCOMP). The comparison is carried out in accordance with the NAND flash status mask register (FCDP_NFMASK). The interrupt service routine can read the actual status byte from the NAND flash status register (FCDP_NFSTATUS). After the flash status error interrupt, the FCDP waits for the FLUSH command in order to ensure that the error has been identified independently of the interrupt delay. After reception of the FLUSH command, the FCDP resumes its normal operation by requesting the next command.

FIFO Overflow/underrun Error Interrupt (FIFO)

A FIFO overflow/underrun error interrupt occurs when a read access takes place to the read buffer register (FCDP_RDBUF) while the FIFO is empty, or when a write access takes place to the write buffer register (FCDP_WRBUF) while the FIFO is full.

Protection Error Interrupt (PE)

A protection error interrupt occurs in the following situations:

A command which has been specified as being protected in the NAND flash "protected command" register (FCDP_NFPROTCMD) is output in a protected NAND flash address region (page) as is specified in the NAND flash address window registers (FCDP_NFADDRWIN1L, FCDP_NFADDRWIN2L). After a protection error interrupt during NAND flash transactions (that is to say not during the configuration of the protection registers FCDP_NFPASSW, FCDP_NFPROTCMD, FCDP_NFADDRWIN1L and FCDP_NFADDRWIN1H for FCDP_MODE.RUN='0'), the FCDP waits for the FLUSH command in order to ensure that the error has been identified independently of the interrupt delay. After reception of the FLUSH command, the FCDP resumes normal operation by requesting the next command.

The NAND flash "protected command" register (FCDP_NFPROTCMD) is written to without having to open it first of all by writing the correct password to the NAND flash password register (FCDP_NFPASSWD).

The NAND flash address window 1 register (FCDP_NFADDRWIN1L) is written to without having to open it first of all by writing the correct password to the NAND flash password register (FCDP_NFPASSWD).

An incorrect password has been written to the NAND flash password register (FCDP_NFPASSWD).

Command Error Interrupt (CE)

A command error interrupt is produced when an undefined command has been written to the command register FCDP_COMMAND. After the command error interrupt, the FCDP waits for the FLUSH command in order to ensure that the error has been identified independently of the interrupt delay. After reception of the FLUSH command, the FCDP resumes normal operation by requesting the next command.

Command Overflow Error Interrupt (CO)

A command overflow error interrupt is produced when a command is written to the command register FCDP_COMMAND before the previous command has been processed completely, that is to say the next command has not yet been requested.

AHB Error Interrupt (AE)

An AHB error interrupt occurs when an AHB error response has been detected by the AHB master interface in the FCDP. The reason for the AHB error must be indicated to this interface by the AHB slave module. Once an AHB error interrupt has been produced, command execution is terminated immediately, and the FCDP waits for the FLUSH command in order to ensure that the error has been identified independently of the interrupt delay. After reception of the FLUSH command, the FCDP resumes normal operation by requesting the next command.

The basic address of the NAND flash device is specified in an FCDP configuration register. The AHB master interface has to produce only three different addresses, which are dependent on the access type, for NAND flash devices:

<BASE>: Data;
<BASE>+0x20000: Address; and
<BASE>+0x40000: Command.

When INCR4 burst transmissions are selected by means of the NF_WR command or the NF_RD command, then the addresses are produced in accordance with the AHB specification.

The NAND flash page address and the NAND flash row address are part of the FCDP command sequence, and are independent of the AHB address production.

For NOR flash devices, the FCDP produces the address and the AHB transmission type (SEQUENTIAL or NONSEQUENTIAL) for each read access: <START>, <START>+0x04, <START>+0x08, <START>+0x0C, . . . <START> denotes the initial start address of a sequence of transmissions. It must be remembered that <START> must be aligned with a word address boundary and that a burst must not cross a 1 KB boundary, as it is defined in the AHB specification.

The initial start address and the number of bursts to be carried out are part of the FCDP command sequence.

The burst mode write command works in the same way as the burst mode read command.

A hardware protection mechanism prevents inadvertent or unauthorized NAND flash delete and write operations.

The FCDP compares the addresses of write and read commands with the address areas that are enabled for writing. The FCDP suppresses the output of these commands to the flash device and produces an error interrupt if the address is not within the permissible address area.

The protection is implemented on a page basis. The contents of the protection unlocking register specify a page address area. A set of NAND flash commands covered by the write and delete protection function must be defined by software, for example, block deletion (D0h) and page program (10h). If the specified page address is not located within the permissible address area (address window) and the subsequent command is specified as a protection command, a protection command interrupt is produced, and the critical command will not be sent to the NAND flash.

Figure 7:
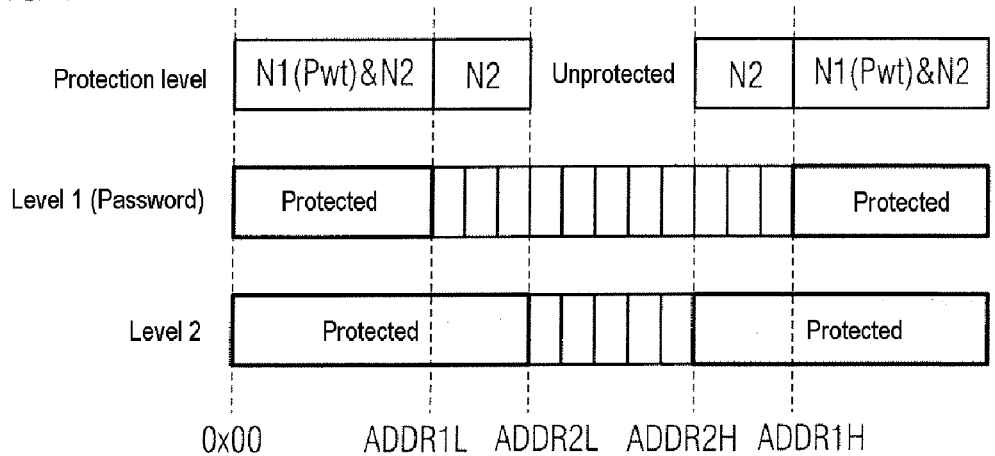
FIG. 7 shows, schematically, one exemplary embodiment of an FCDP protection configuration.

As is illustrated in FIG. 7, two levels N1, N2 of write protection are implemented. Only those address areas which are open in both levels N1, N2 can be used for write and delete operations. After a reset, both locking processes cover the entire address area.

The setting of a first level address window register allows a part of the address area to be used for write and delete operations. This first protection level N1 protects the code and the major functions, for example of a mobile telephone, against being overwritten.

The second protection level N2 is specified in a similar register. This could be used for individual drivers, for example for the flash file system.

The protection command set register and the first level address window register are protected by a password mechanism.

In order to reduce the dynamic power consumption, the FCDP provides four different operating modes, specifically:

Sleep: The peripheral clock in the FCDP_CLC register has been switched off. In this mode, only read access to registers is possible.

Configuration: The peripheral clock in the FCDP_CLC register has been switched on, and the run mode is deactivated (FCDP_MODE.RUN='0'). In this mode, a write access is possible to all registers with the exception of the FCDP_COMMAND. The clock for most parts of the peripheral core is deactivated.

Only NOR flash mode operation: The peripheral clock in the FCDP_CLC register has been switched on, the run mode is enabled (FCDP_MODE.RUN='1') and NAND flash operation is switched off (FCDP_MODE.NFEN='0'). In this mode, no write access to configuration registers is possible. FCDP commands with the exception of NAND flash commands can be written to the FCDP_COMMAND register. The clock for NAND flash-specific parts of the core is switched off.

Full operation: The peripheral clock in the FCDP_CLC register is switched on, the run mode is activated FCDP_MODE.RUN='1') and NAND flash operation is activated (FCDP_MODE.NFEN='1'). In this mode, no write access to configuration registers is possible. All FCDP commands including the NAND flash commands can be written to the FCDP_COMMAND register.

Finally, the interfaces provided in the described exemplary embodiment will be explained in more detail in the following text.

AHB Slave Interface
supported transmission size: 32 bits;
supported burst sizes: SINGLE, INCR4 (FIFO only read/write);
supported transmission responses: OKAY, ERROR.

AHB Master Interface
supported transmission size: 32 bits (+16 bits for certain NAND flash accesses);
supported burst sizes: SINGLE, INCR4;
AHB lite interface.

DMAC Interface
supports burst requests and "last burst" requests for data;
individual transmissions can be handled in the same way as bursts of a transmission by the DMAC;
supports individual request for commands;
requires two independent DMA channels for data and commands;
all DMA requests can optionally be handled as interrupts.

NAND Flash Interface
nand_flash_busy_n_i: linked to the Ready/Busy_N output of the flash device. This signal is handled completely asynchronously.

Debug Interface
The debug interface allows certain internal signals of the FCDP to be monitored. The signals which are available for access at the monitoring pins of the device are listed in Table 3.

TABLE 3

Monitoring signals

| Bits | Signal | Description | Source |
| --- | --- | --- | --- |
| [5:0] | state | FSM state | fcdp__control |
| 6 | cmd_ind | Command indication | fcdp__registerblock |
| 7 | cmd_ack | Command acknowledgement | fcdp__control |
| 8 | run_ack | Run acknowledgement | fcdp__control |
| 9 | wr_req | Write request | fcdp__control |
| 10 | rd_req | Read request | fcdp__control |
| 11 | dtack | Data acknowledgement | fcdp__ahb__master |
| 12 | rwack | Read/write acknowledgement | fcdp__ahb__master |
| 13 | rx_data_ind | Data reception indication | fcdp__control |
| 14 | tx_data_ack | Data transmission acknowledgement | fcdp__control |
| 15 | kernel_clk_mon | Core clock state-change signal | fcdp__clc |

In the following text, a more comprehensive description of the NAND h ECC register is provided.

The FCDP_NFECCCONFIG register makes it possible to specify whether the main area ECC and the spare area ECC should be written to the NAND flash by the NF_WR command and should be checked by the NF_RD command. The MAINSIZE field defines the size of the main area of a page, which must be a power of 2 (32-bit words).

The FCDP_NFMECCPTR and FCDP_NFSECCPTR registers denote the memory location of the main area ECC and of the spare area ECC within a page.

The spare area for ECC production/checking starts immediately after the main area (defined by FCDP_NFECCCONFIG.MAINSIZE and ends at a position defined by FCDP_NFSECCPTR. Software must be used to ensure that this area does not exceed 32 bytes (see FIG. 9).

The FCDP_NFIECCPTR register defines a 16-bit word within the spare area of a page which is excluded from the ECC production. In exemplary embodiments in which this feature is not required, FCDP_NFIECCPTR can be set to a value outside the valid page size.

FCDP_NFMECCPTR must be aligned with a 32-bit address boundary, while FCDP_NFSECCPTR and FCDP_NFIECCPTR must be aligned with a 16-bit address boundary.

The spare area ECC must follow that part of the spare area which it protects.

FIG. 8 shows one example of a page configuration. The dashed area is excluded from the spare area ECC calculation.

The FCDP_NFMECCST and FCDP_NFSECCST registers respectively indicate the main area ECC and the spare area ECC. Once a write command (NF_WR) has been carried out completely, both registers show the ECC calculated from the written page data. Once a read command (NF_RD) has been carried out completely, both registers show the result of the ECC which was calculated by exclusive-OR linking of the read data with the read ECC.

If the check is activated and the result is not equal to zero, the associated ECC error interrupt is produced. Software can now read the ECC status register in order to determine the error type and to initiate further measures. The configuration of the ECC status register makes it possible to check whether this is a correctable error (P<8192 ... P1>XOR P<8192 ... P1>') and allows the location of the bit error to be read efficiently.

After completion of the ECC error interrupt, the error must be confirmed by writing the FLUSH command to the command register.

Figure 10:
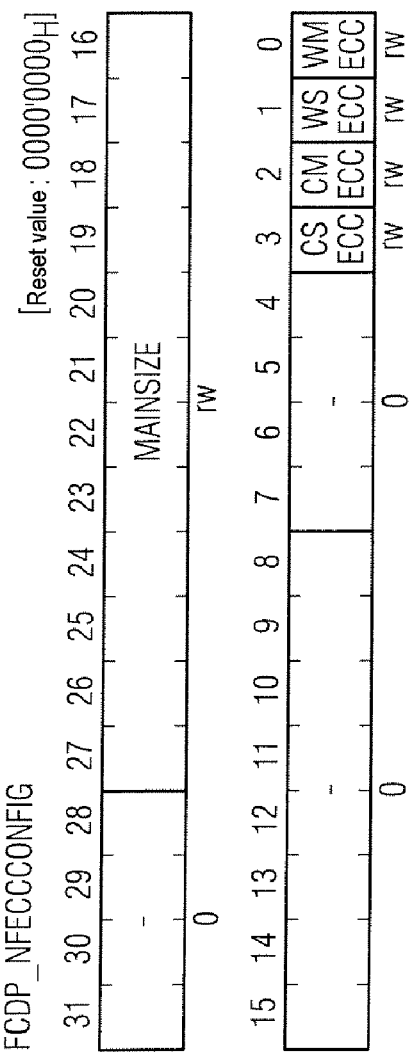
FIG. 10 shows, schematically, the FCDP_NFECCCONFIG register according to the FCDP exemplary embodiment shown in FIG. 5, in which case a description of the associated register fields can be found in Table 4.
Figure 11:
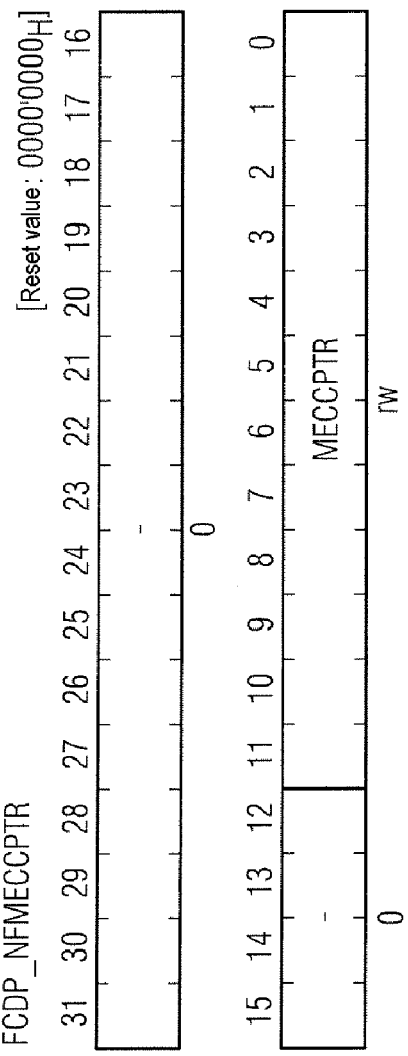
FIG. 11 shows, schematically, the FCDP_NFMECCPTR register according to the FCDP exemplary embodiment shown in FIG. 5, in which case a description of the associated register fields can be found in Table 5.
Figure 12:
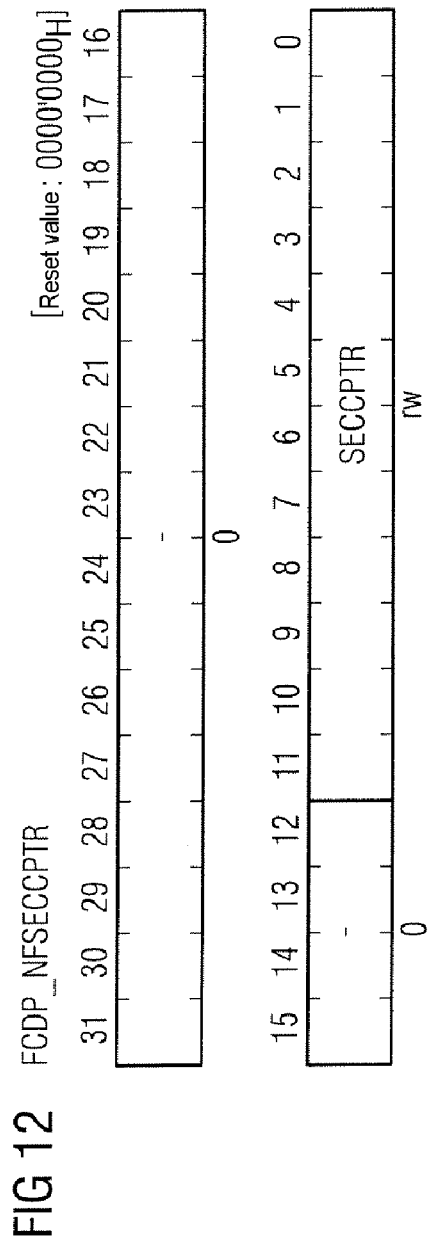
FIG. 12 shows, schematically, the FCDP_NFSECCPTR register according to the FCDP exemplary embodiment shown in FIG. 5, in which case a description of the associated register fields can be found in Table 6.
Figure 13:
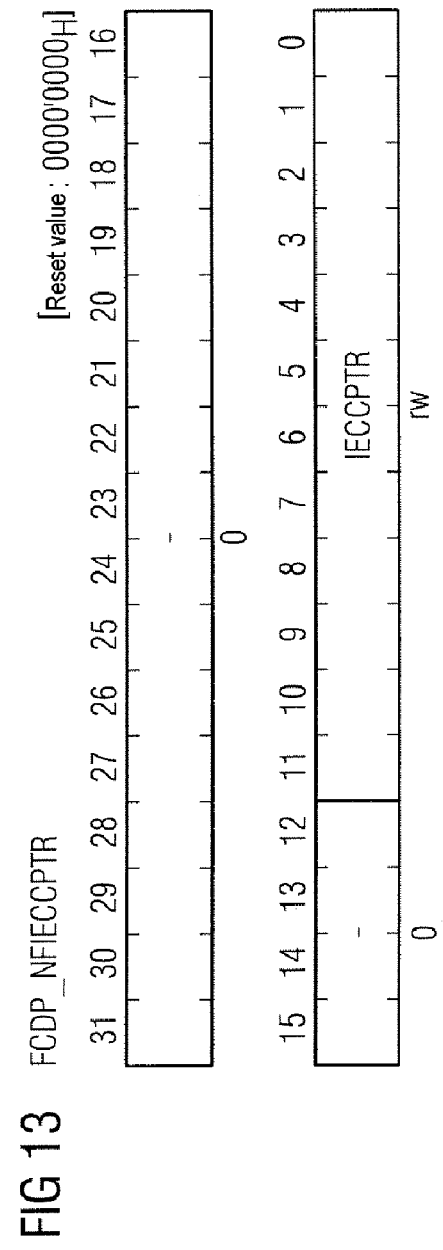
FIG. 13 shows, schematically, the FCDP_NFIECCPTR register according to the FCDP exemplary embodiment shown in FIG. 5, in which case a description of the associated register fields can be found in Table 7.
Figure 14:
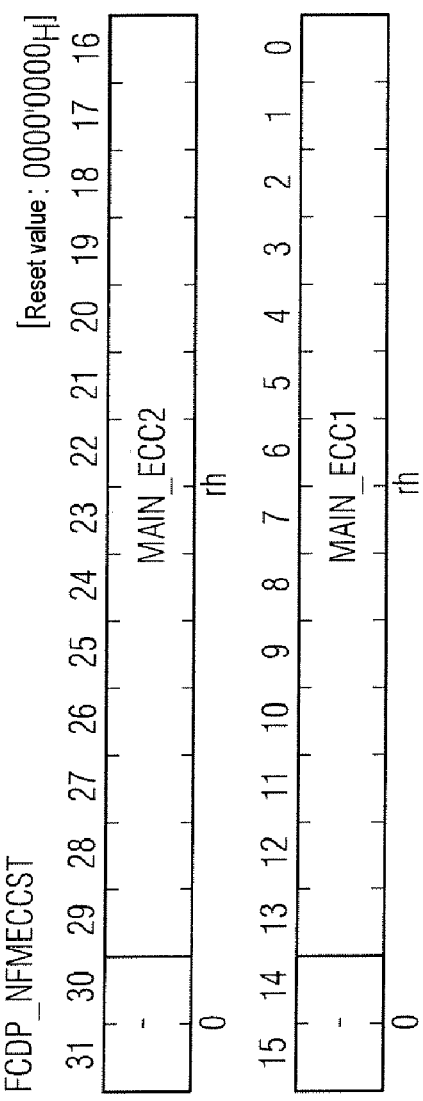
FIG. 14 shows, schematically, the FCDP_NFMECCST register according to the FCDP exemplary embodiment shown in FIG. 5, in which case a description of the associated register fields can be found in Table 8.
Figure 15:
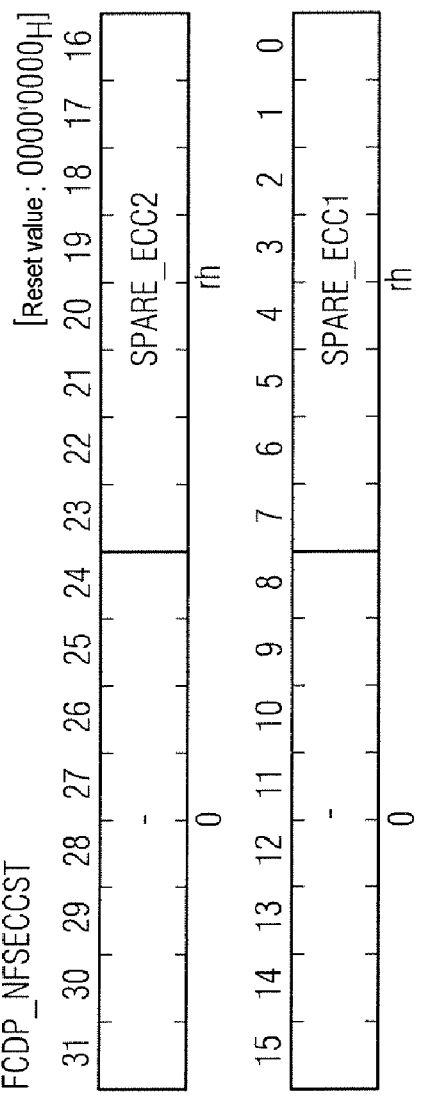
FIG. 15 shows, schematically, the FCDP_NFSECCST register according to the FCDP exemplary embodiment shown in FIG. 5, in which case a description of the associated register fields can be found in Table 9.

The following Tables 4 to 9 should be read in conjunction with FIGS. 10 to 15 (Table 4—FIG. 10, Table 5—FIG. 11, Table 6—FIG. 12, etc.). The last-mentioned tables and figures provide a visual illustration of the NAND flash ECC register.

TABLE 4

| Field | Bits | Type | Description |
| --- | --- | --- | --- |
| WMECC | 0 | rw | Write main area ECC<br>0: deactivated<br>1: activated |
| WSECC | 1 | rw | Write spare area ECC<br>0: deactivated<br>1: activated |
| CMECC | 2 | rw | Compare main area ECC<br>0: deactivated<br>1: activated |
| CSECC | 3 | rw | Compare spare area ECC<br>0: deactivated<br>1: activated |
| — | 15:4 | 0 | not implemented, reserved |
| MAINSIZE | 27:16 | rw | Main area size<br>Defined to the size of the main area in bytes. The size is restricted to $2^x$ 32-bit words. |
| — | 31:28 | 0 | not implemented, reserved |

TABLE 5

| Field | Bits | Type | Description |
| --- | --- | --- | --- |
| MECCPTR | 11:0 | rw | Main area ECC pointer address 32-bit aligned |
| — | 31:12 | 0 | not implemented, reserved |

TABLE 6

| Field | Bits | Type | Description |
| --- | --- | --- | --- |
| SECCPTR | 11:0 | rw | Spare area ECC pointer address 16-bit aligned |
| — | 31:12 | 0 | not implemented, reserved |

TABLE 7

| Field | Bits | Type | Description |
| --- | --- | --- | --- |
| IECCPTR | 11:0 | rw | Ignoring area ECC pointer address 16-bit aligned |
| — | 31:12 | 0 | not implemented, reserved |

TABLE 8

| Field | Bits | Type | Description |
| --- | --- | --- | --- |
| MAIN_ECC1 | 13:0 | rh | Main area ECC<br>P8192, P4096, P2048, P1024, P512, ..., P1 |
| — | 15:14 | 0 | not implemented, reserved |
| MAIN_ECC2 | 29:16 | rh | Main area ECC<br>P8192', P4096', P2048', P1024', P512', ..., P1' |
| — | 31:30 | 0 | not implemented, reserved |

TABLE 9

| Field | Bits | Type | Description |
| --- | --- | --- | --- |
| SPARE_ECC1 | 7:0 | rh | Spare area ECC<br>P128, P64, P32, ..., P1 |
| — | 15:8 | 0 | not implemented, reserved |
| SPARE_ECC2 | 23:16 | rh | Spare area ECC<br>P128', P64', P32', ..., P1' |
| — | 31:24 | 0 | not implemented, reserved |

The protection registers will be explained in more detail in the following text with reference to FIGS. 16 to 22.

Figure 16:
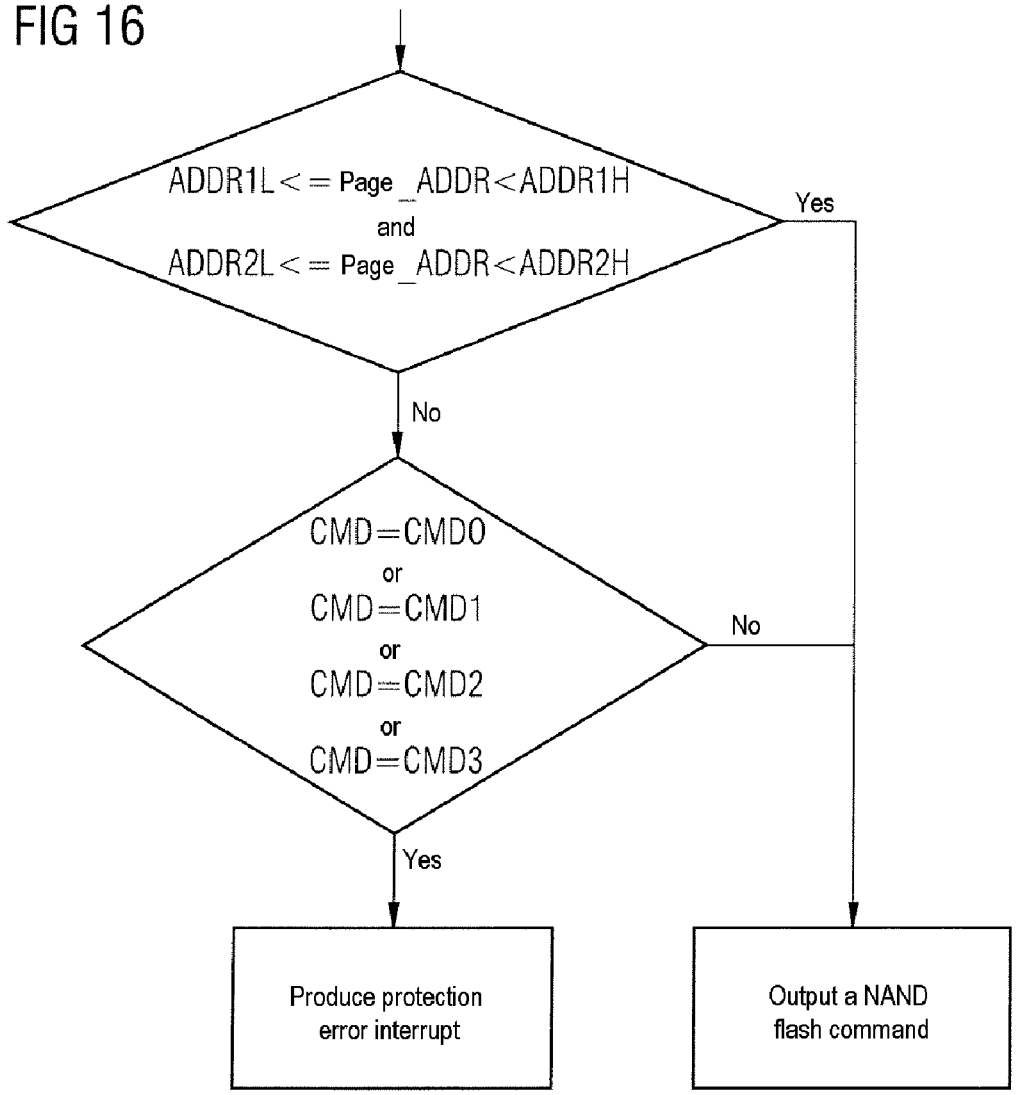
FIG. 16 shows a program running plan for one exemplary embodiment of a protection mechanism.
Figure 17:
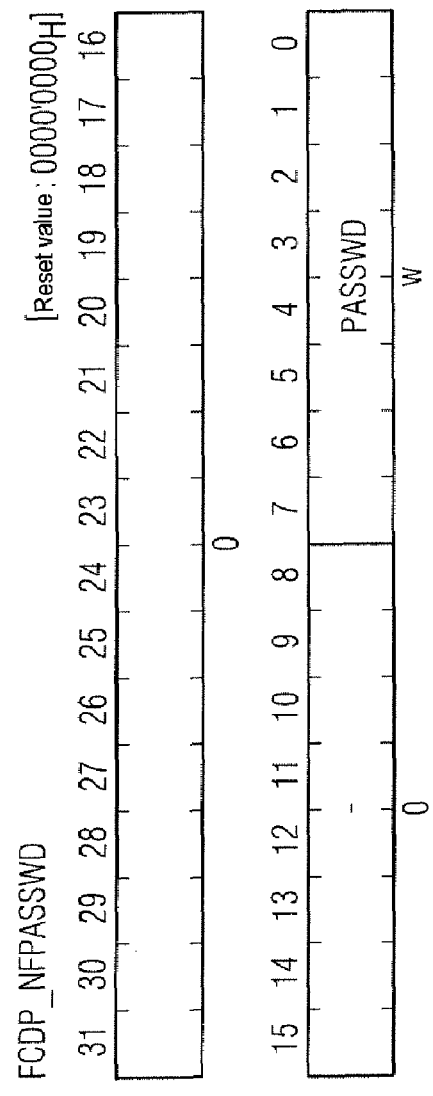
FIG. 17 shows, schematically, the FCDP_NFPASSWD register according to the FCDP exemplary embodiment shown in FIG. 5, in which case a description of the associated register fields can be found in Table 10.
Figure 18:
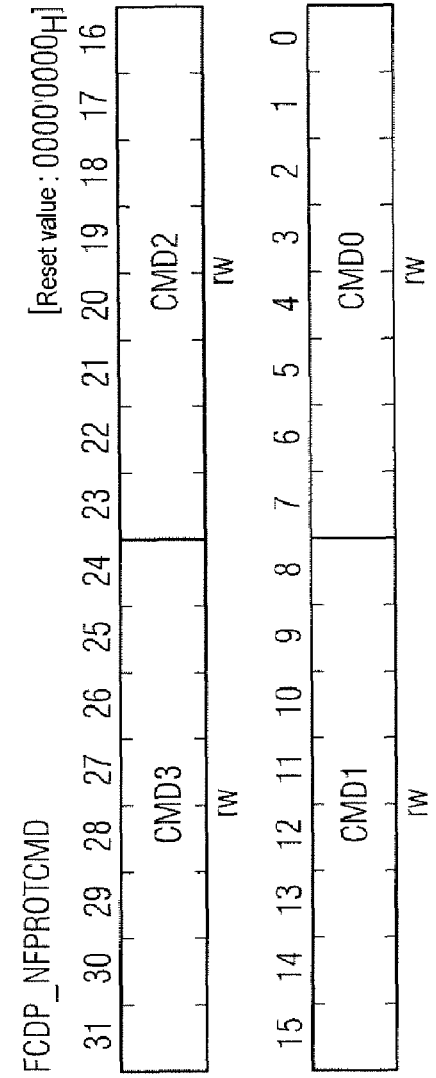
FIG. 18 shows, schematically, the FCDP_NFPROTCMD register according to the FCDP exemplary embodiment shown in FIG. 5, in which case a description of the associated register fields can be found in Table 11.
Figure 19:
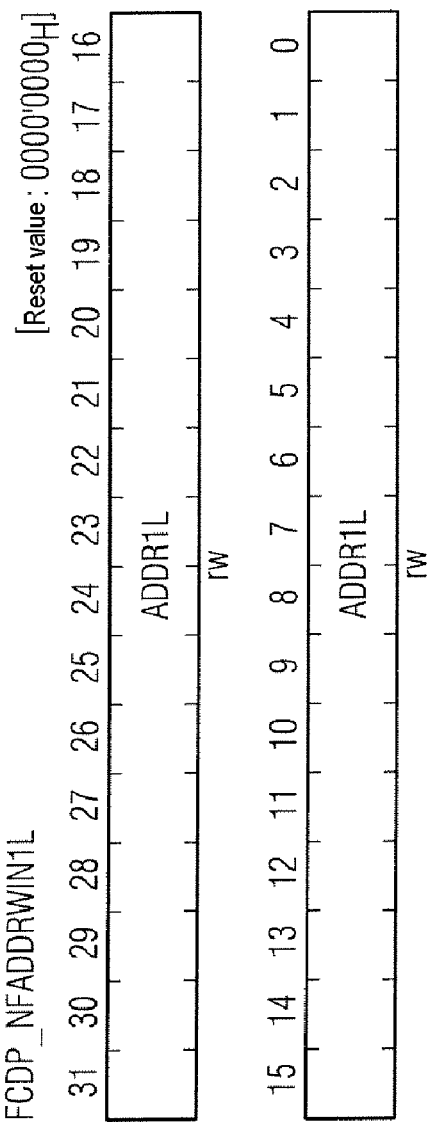
FIG. 19 shows, schematically, the FCDP_NFADDRWIN1L register according to the FCDP exemplary embodiment shown in FIG. 5, in which case a description of the associated register fields can be found in Table 12.
Figure 20:
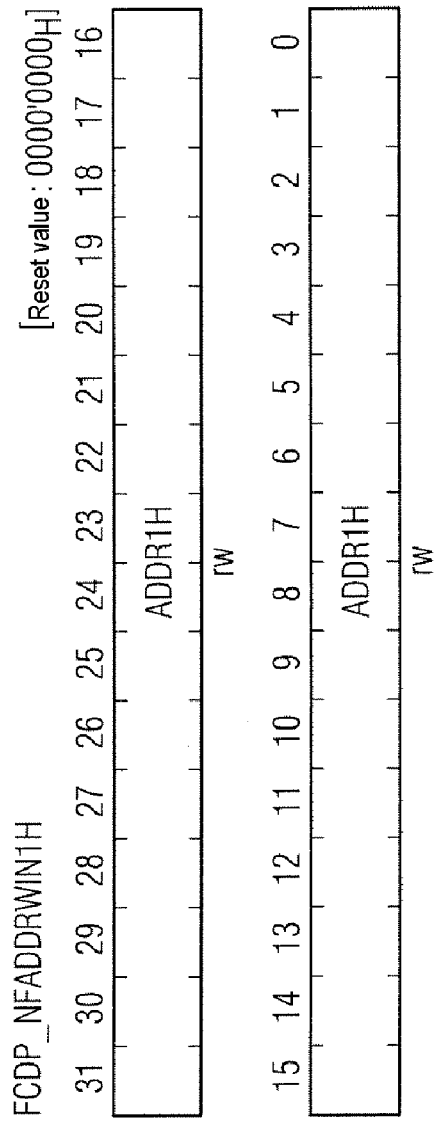
FIG. 20 shows, schematically, the FCDP_NFADDRWIN1H register according to the FCDP exemplary embodiment shown in FIG. 5, in which case a description of the associated register fields can be found in Table 13.

FIG. 16 shows the protection mechanism schematically. When a specified NAND flash row address (page/block address) is not located within the address area specified by the NAND flash address window registers (FCDP_NFADDRWIN1L, FCDP_NFADDRWIN1H, FCDP_NFADDRWIN2L, and FCDP_NFADDRWIN2H) then the following NAND flash command is compared with the list of protected commands CMD0 ... 3 which are stored in the FCDP_NFPROTCMD register. If a match is found, a protection error interrupt is output, and the FCDP is stopped. Otherwise, the NAND flash command is valid, and is passed to the flash device (see also FIG. 7).

The NAND flash row address is received internally during the execution of the NF_ADDR command. This address is used by the protection mechanism during all subsequent NF_CMD commands until a new row address is specified by another NF_ADDR command. Only the second NAND flash command byte (of a two-byte command cycle) should therefore be specified in the FCDP_NFPROTCMD register, in order to ensure correct operation of the protection mechanism.

There are two possible ways to switch off the protection mechanism:
1. Only blind commands (that is to say invalid command bytes for the NAND flash device that is being used) are specified in the FCDP_NFPROTCMD register.

2. The address window registers are configured such that they include the entire NAND flash row address area.

The CMD1 "protected command" register and the address window registers for the first protection level N1 (FCDP_NFADDRWIN1L and FCDP_NFADDRWIN1H) are protected by the FCDP_NFPASSWD password register. The password must be defined by the first write access to this register after being reset. Each subsequent write access with the same password opens the protected registers for one and only one write access. The content of the password register cannot be read.

The following Tables 10 to 15, which should be read in conjunction with the FIGS. 17 to 22, respectively (Table 10—FIG. 17, Table 11—FIG. 18, Table 12—FIG. 19, etc.) provide a more detailed overview of the individual protection registers.

TABLE 10

| Field | Bits | Type | Description |
|---|---|---|---|
| PASSWD | 7:0 | w | Password<br>The first write access after resetting defines the password. Each subsequent write access with the correct password opens the protected registers for one and only one write access.<br>A write access with an incorrect password is ignored.<br>Reading this register always returns zero. |
| — | 31:8 | 0 | not implemented, reserved |

TABLE 11

| Field | Bits | Type | Description |
|---|---|---|---|
| CMD0 | 7:0 | rw | Command 0 defines a protected command. |
| CMD1 | 15:8 | rw | Command 1 defines a protected command. |
| CMD2 | 23:16 | rw | Command 2 defines a protected command. |
| CMD3 | 31:24 | rw | Command 3 defines a protected command. |

It should be noted that the FCDP_NFPROTCMD register can be modified only when it has been opened using the FCDP_NFPASSWD password register. The register is closed again after a write access.

TABLE 12

| Field | Bits | Type | Description |
|---|---|---|---|
| ADDR1L | 31:0 | rw | Level 1 protection address window lower limit |

It should be noted that the FCDP_NFADDRWIN1L register can be modified only when it has been opened using the FCDP_NFPASSWD password register. The register is closed again after a write access.

TABLE 13

| Field | Bits | Type | Description |
|---|---|---|---|
| ADDR1H | 31:0 | rw | Level 1 protection address window upper limit |

It should be noted that the FCDP_NFADDRWIN1H register can be modified only when it has been opened using the FCDP_NFPASSWD password register. The register is closed again after a write access.

TABLE 14

| Field | Bits | Type | Description |
|---|---|---|---|
| ADDR2L | 31:0 | rw | Level 2 protection address window lower limit |

It should be noted that the FCDP_NFADDRWIN2L register is not password-protected.

TABLE 15

| Field | Bits | Type | Description |
|---|---|---|---|
| ADDR2H | 31:0 | rw | Level 2 protection address window upper limit |

It should be noted that the FCDP_NFADDRWIN2H register is not password-protected.

While the foregoing is directed to embodiments of the present invention, other and further embodiments of the invention may be devised without departing from the basic scope thereof, and the scope thereof is determined by the claims that follow.

What is claimed is:

1. An apparatus for data transmission between a first memory and a second memory, the apparatus comprising:
a first memory controller operatively connected to the first memory; and
a memory protocol controller operatively connected between the first memory controller and the second memory, wherein the first memory is a volatile memory and the second memory is a nonvolatile memory, wherein a command list containing a command sequence for controlling the memory protocol controller is stored in the first memory, and wherein the command list in the first memory includes commands for the memory protocol controller and additionally commands for the nonvolatile memory,
wherein the first memory controller is a direct memory access controller configured such that:
commands from the command list are transmitted by the direct memory access controller to the non-volatile memory;
only memory protocol controller commands are interpreted by the memory protocol controller; and
each command for the non-volatile memory is preceded by a command to output to the non-volatile memory, whereby commands for the non-volatile memory are passed to the non-volatile memory.

2. The apparatus of claim 1, wherein the first memory controller is a direct memory access controller.

3. The apparatus of claim 1, further comprising a second memory controller connected in series with the memory protocol controller and the first memory controller.

4. The apparatus of claim 3, wherein the memory protocol controller is disposed between the first and second memory controllers, and wherein the first memory controller is a direct memory access controller and the second memory controller is a conventional memory controller.

5. The apparatus of claim 1, wherein data to be transmitted from the volatile memory to the non-volatile memory is at least one of:
- stored in a separate list in the volatile memory; and
- stored as part of the command list in the volatile memory.

6. The apparatus of claim 1, wherein, once the memory protocol controller has carried out a command, the memory protocol controller passes a request for a next command on a command request line of the direct memory access controller, wherein the direct memory access controller then transmits the next command from the volatile memory to the memory protocol controller, and wherein this sequence is repeated until the direct memory access controller comes to an end of the command list.

7. The apparatus of claim 6, further comprising:
- a microprocessor configured such that the direct memory access controller passes an interrupt signal to the microprocessor at the end of the command list as a signal for indicating that the task has been carried out completely.

8. The apparatus of claim 7, wherein the start of data transmission is initiated by the microprocessor by setting a run bit in the memory protocol controller when the command list in the volatile memory has been set up completely, and wherein, thereafter, the data transmission process takes place without any further microprocessor control unless error conditions occur.

9. The apparatus of claim 8, wherein the memory protocol controller provides a signal indicating an occurrence of error condition to the microprocessor, wherein a cause of an error and an address of a respective last command to be carried out are read by the microprocessor from a status register, and wherein all further requests after the error condition are output to the direct memory access controller.

10. The apparatus of claim 9, wherein the memory protocol controller is configured to produce at least one of an error detection code and an error correction code for the error condition.

11. The apparatus of claim 10, wherein, for read operations, the memory protocol controller compares the error detection code produced during the read operation with a stored error detection code stored in the non-volatile memory, and wherein, for a read error, the memory protocol controller performs one of correcting the error condition and triggering an interrupt to the microprocessor.

12. The apparatus of claim 10, wherein, for write operations, the memory protocol controller produces the error correction code and writes the error correction code to a predetermined point in the non-volatile memory.

13. The apparatus of claim 1, further comprising:
- at least one control line connecting the memory protocol controller directly to the non-volatile memory.

14. The apparatus of claim 1, wherein the data is transmitted in data packets.

15. The apparatus of claim 1, wherein the memory protocol controller includes a data buffer.

16. The apparatus of claim 1, wherein the memory protocol controller is configured to carry out data compression and data decompression for at least one of write operations and read operations.

17. The apparatus of claim 1, further comprising:
- a microprocessor, wherein the memory protocol controller is configured to signal error conditions to the microprocessor.

* * * * *